US012685901B2

(12) United States Patent
Ishimoto et al.

(10) Patent No.: US 12,685,901 B2
(45) Date of Patent: Jul. 21, 2026

(54) TRAINING DEVICE AND TRAINING SYSTEM

(71) Applicant: ATSUMITEC CO., LTD., Hamamatsu (JP)

(72) Inventors: Junichi Ishimoto, Hamamatsu (JP); Sungmin Lee, Hamamatsu (JP); Kaito Kasahara, Hamamatsu (JP)

(73) Assignee: ATSUMITEC CO., LTD., Shizuoka (JP)

( * ) Notice: Subject to any disclaimer, the term of this patent is extended or adjusted under 35 U.S.C. 154(b) by 134 days.

(21) Appl. No.: 18/762,134

(22) Filed: Jul. 2, 2024

(65) Prior Publication Data

US 2025/0010136 A1      Jan. 9, 2025

(30) Foreign Application Priority Data

Jul. 7, 2023    (JP) ................................. 2023-111987
Mar. 18, 2024    (JP) ................................. 2024-042528

(51) Int. Cl.
    *A63B 24/00*        (2006.01)
    *A63B 21/00*        (2006.01)
    (Continued)

(52) U.S. Cl.
    CPC ...... *A63B 24/0062* (2013.01); *A63B 21/0056* (2013.01); *A63B 21/153* (2013.01);
    (Continued)

(58) Field of Classification Search
    CPC ............ A63B 24/0062; A63B 21/0056; A63B 21/153; A63B 2024/0093; A63B 2069/0008; A63B 2220/807; A63B 2220/10; A63B 23/03541; A63B 23/1209; A63B 2071/0638; A63B 21/0058; A63B 21/4035; A63B 21/4043; A63B 71/0622; A63B 2220/13; A63B 2220/20; A63B 2220/24; A63B 2220/30; A63B 2220/40; A63B 2220/51; A63B 2220/833; A63B 24/0087; A63B 2220/16; A63B 2220/54;
(Continued)

(56) References Cited

U.S. PATENT DOCUMENTS 5,271,416 A * 12/1993 Lepley ................. A61B 5/1036
                                                          600/595
5,816,372 A * 10/1998 Carlson ............ A63B 21/00845
                                                          188/290

(Continued)

FOREIGN PATENT DOCUMENTS

JP          2002-126122 A      5/2002
JP            4956808 B2      6/2012
(Continued)

*Primary Examiner* — Andrew M Kobylarz
(74) *Attorney, Agent, or Firm* — Keating & Bennett, LLP

(57)          ABSTRACT

A training device includes, a cable that is paid out in response to movement of a user, a reel on which the cable is wound, a rotary encoder to detect a rotation state of the reel, a magneto-rheological fluid brake to apply a braking force to the reel, and a controller configured or programmed to calculate a stroke amount of the cable based on an output value of the rotary encoder and to control the braking force based on the stroke amount to change a magnitude of a load during the movement.

6 Claims, 7 Drawing Sheets

(51) Int. Cl.
    *A63B 21/005*     (2006.01)
    *A63B 69/00*     (2006.01)
    *F16D 57/00*     (2006.01)

(52) U.S. Cl.
    CPC .... *F16D 57/002* (2013.01); *A63B 2024/0093* (2013.01); *A63B 2069/0008* (2013.01); *A63B 2220/807* (2013.01)

(58) Field of Classification Search
    CPC ........ A63B 2220/805; A63B 2220/806; A63B 2220/89; A63B 2225/20; A63B 2225/50; A63B 21/0052; F16D 57/002
    See application file for complete search history.

(56) References Cited

U.S. PATENT DOCUMENTS

| | | | |
|---|---|---|---|
| 8,070,657 B2 * | 12/2011 | Loach | A63B 21/15 482/127 |
| 9,662,534 B1 * | 5/2017 | Liu | A63B 21/0051 |
| 2012/0142497 A1 | 6/2012 | Ishii et al. | |
| 2018/0214730 A1 * | 8/2018 | Larose | A61H 1/0237 |
| 2019/0111300 A1 * | 4/2019 | Battlogg | B01D 69/14 |
| 2024/0245947 A1 * | 7/2024 | MacDonald | A63B 21/0442 |

FOREIGN PATENT DOCUMENTS

| | | | | |
|---|---|---|---|---|
| JP | 2012120638 A | 6/2012 | | |
| JP | 2014061121 A | 4/2014 | | |
| JP | 2019077037 A | * 5/2019 | | F03G 5/062 |
| JP | 2020190786 A | 11/2020 | | |
| WO | WO-2014196866 A1 | * 12/2014 | | A63B 69/24 |

* cited by examiner

TRAINING DEVICE AND TRAINING SYSTEM

CROSS REFERENCE TO RELATED APPLICATIONS

This application claims the benefit of priority to Japanese Patent Application No. 2023-111987 filed on Jul. 7, 2023 and Japanese Patent Application No. 2024-042528 filed on Mar. 18, 2024. The entire contents of these applications are hereby incorporated herein by reference.

BACKGROUND OF THE INVENTION

1. Field of the Invention

The present invention relates to training devices and training systems.

2. Description of the Related Art

For muscle strengthening or rehabilitation, a training apparatus that utilizes the weight of a weight is often used. Generally, such a training apparatus for weight training is configured for a certain movement for applying a concentrated load to a target for muscle training, such as a certain muscle or a body part, and is designed to allow for load adjustment by adjusting the weight of the weight.

However, a training apparatus that allows for adjusting a magnitude of the load without using a weight is also known. For example, muscle training apparatuses disclosed in Japanese Unexamined Patent Application Publication No. 2002-126122 and Japanese Patent No. 4956808 include a handle-shaped operation unit to be rotated by a trainee, and the muscle training apparatuses apply electromagnetic rotational resistance that resists the operation. More specifically, in these conventional technologies, a rotating body that rotates in response to rotation operation of the handle by a trainee is placed in an electro-rheological or magneto-rheological fluid, and the load experienced by the user is adjusted by controlling magnitude of electricity or magnetism applied to the viscous fluid to control viscous resistance against the rotation.

SUMMARY OF THE INVENTION

However, in the above-described training apparatuses, a load is applied to a simple movement that uses only a specific muscle or body part that is training target. Such a load may not be appropriate for a practical sport movement, and thus the above-described training apparatuses may be unsuitable for efficient training. In addition, in the conventional training apparatus, a movement form is restricted by the structure of the apparatus, and thus it is not possible to achieve a training that involves coordination of the muscles of the entire body. Thus, in particular, the conventional training apparatus is unsuitable for training for improving performance of professional athletes.

Example embodiments of the present invention provide training devices and training systems each allowing for efficient training in line with a practical sport movement.

A first example embodiment of the present invention is a training device including, a cable that is paid out in response to movement of a user, a measurer to measure a stroke amount of the cable, a magneto-rheological fluid brake to apply a braking force to the cable, and a controller configured or programmed to calculate the stroke amount of the cable based on an output value of the measurer, in which the controller is configured or programmed to control the braking force based on the stroke amount to change a magnitude of a load during the movement.

The training device according to the first example embodiment of the present invention can calculate a stroke amount of the cable with respect to training movement and change the braking force against paying out of the cable, according to the stroke amount, to change the magnitude of the load during the training movement. Here, the user's movement in three-dimensional space is not restricted by the structure of the device, and, for example, the user is subjected to a training load during a realistic movement that involves coordination of the muscles of the entire body. Thus, the training device allows for the user to efficiently perform training in line with a practical sport movement.

A second example embodiment of the present invention is the training device of the first example embodiment of the present invention in which the measurer includes a reel on which the cable is wound and a rotary encoder to detect a rotation state of the reel, and the reel, the rotary encoder, and the magneto-rheological fluid brake are provided on the same rotating shaft.

The training device according to the second example embodiment of the present invention allows for the main rotating components to be arranged close to each other on a straight line. This makes it possible to downsize the device as a whole, reduce loss in torque transmission between components, and improve the accuracy of stroke amount detection and the braking force by the magneto-rheological fluid brake.

A third example embodiment of the present invention is the training device of the first or second example embodiment of the present invention further including a cable angle detector to detect a cable angle being an angle at which the cable is paid out, in which the controller is configured or programmed to control the braking force according to the stroke amount and the cable angle.

The training device according to the third example embodiment of the present invention can detect, in addition to the stroke amount of the cable, the cable angle at which the cable extends. This makes it possible to more accurately recognize the state of movement of the user at each moment, and change the magnitude of the training load not only according to the stroke amount but also according to the cable angle.

A fourth example embodiment of the present invention is a training system including a plurality of the training devices according to the first or second example embodiment of the present invention, in which the plurality of training devices are spaced apart from each other and cooperate to control a direction of the load.

The training system according to the fourth example embodiment of the present invention can generate a training load as a resultant vector of the loads applied at each moment to the cables of the plurality of training devices. This makes it possible to change, during the training movement, not only the magnitude but also the direction of the training load, and thus to perform training more suitable for practical movement.

A fifth example embodiment of the present invention is a training system including, a training device according to the first or second example embodiment of the present invention, and a mover to move the training device, in which the controller is configured or programmed to adjust a position of the training device according to a physique of the user and a type of the movement.

3

The training system according to fifth example embodiment of the present invention may accept input of information on the physique of the user of the training device and information on the type of movement. This makes it possible to automatically move and position the training device according to the information before training, for example.

A sixth example embodiment of the present invention is the training system of the fifth example embodiment of the present invention further including an imager to capture an image of the user, in which the controller is configured or programmed to measure the physique of the user based on information from the imager.

In the training system according to the sixth example embodiment of the present invention, the imager can be used to obtain the physique information of the user. This makes it possible to automatically move the training device to an appropriate position based on the physique information.

A seventh example embodiment of the present invention is the training system of the fifth example embodiment of the present invention further including an imager to capture an image of the user, in which the controller is configured or programmed to change the position of the training device during the movement, based on information from the imager.

The training system according to the seventh example embodiment of the present invention can move the training device as the user's movement form changes over time, while recognizing, by using the imager, the progression of the training movement. This makes it possible to change the direction of the load according to the path of the movement, and thus to generate a training load more suitable for practical movement.

Example embodiments of the present invention provide training devices and training systems each allowing for efficiently performing training in line with a practical sport movement.

The and other above elements, features, steps, characteristics and advantages of the present invention will become more apparent from the following detailed description of the example embodiments with reference to the attached drawings.

BRIEF DESCRIPTION OF THE DRAWINGS

FIG. 3 is a waveform diagram showing a load curve corresponding to a series of movements.

FIG. 4 is a perspective view illustrating appearance of a training device according to a second example embodiment of the present invention.

DETAILED DESCRIPTION OF THE EXAMPLE EMBODIMENTS

Hereinafter, example embodiments of the present invention will be described in detail with reference to drawings. Note that the present invention is not limited to the contents described below, and can be modified and implemented as desired without departing from the spirit of the present invention. All of the drawings used to explain the example embodiments illustrate components schematically, and include parts that are emphasized or scaled, or omission to facilitate understanding, and thus may not accurately represent the scale or shape of the components.

First Example Embodiment

Figure 1:
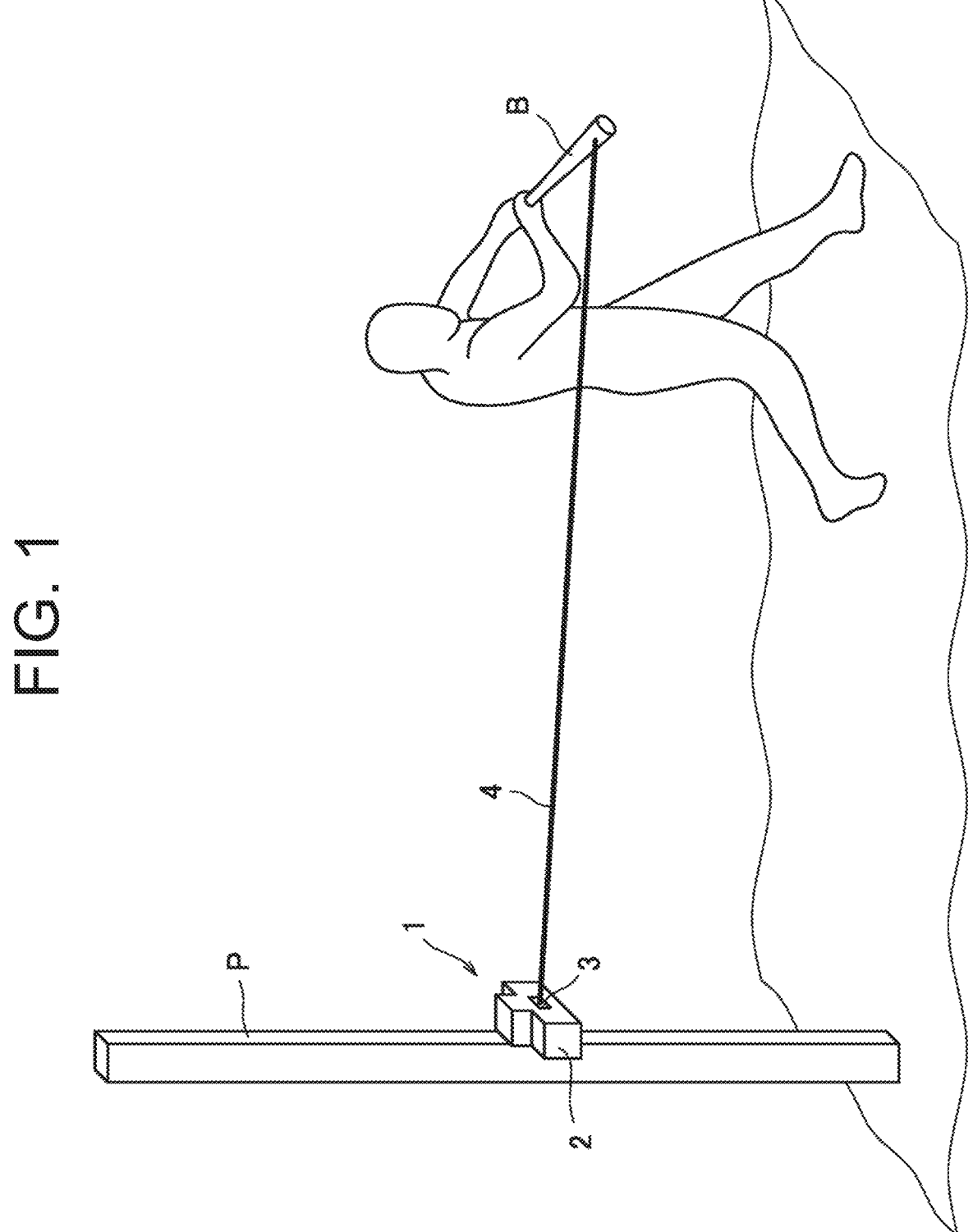
FIG. 1 is a conceptual diagram illustrating an example of use of a training device according to a first example embodiment of the present invention.

FIG. 1 is a conceptual diagram illustrating an example of use of a training device 1 according to a first example embodiment. The training device 1 is a device that can generate practical loads in line with movements in various sports to allow for training. In the present example embodiment, the training device 1 will be described using an example of use in baseball batting practice.

The training device 1 has a configuration in which a cable 4 is paid out from an opening unit 3 provided, in appearance, on a front side of a housing 2, and an end of the cable 4 is connected to or to the vicinity of the center of a bat B. As will be described in detail later, the training device 1 changes a training load during a swing of the bat B by applying a resistive force against a force pulling the cable 4 according to a stroke amount of the cable 4 that is being paid out in response to batting movement of a user. Alternatively, the cable 4 may be connected to a wrist of the user.

In the present example embodiment, the training device 1 is fixed to a predetermined position on a support P, but the fixation position may be changed depending on the movement or user, and the training device 1 may be fixed to a wall, ceiling, or floor depending on the usage form.

Figure 2:
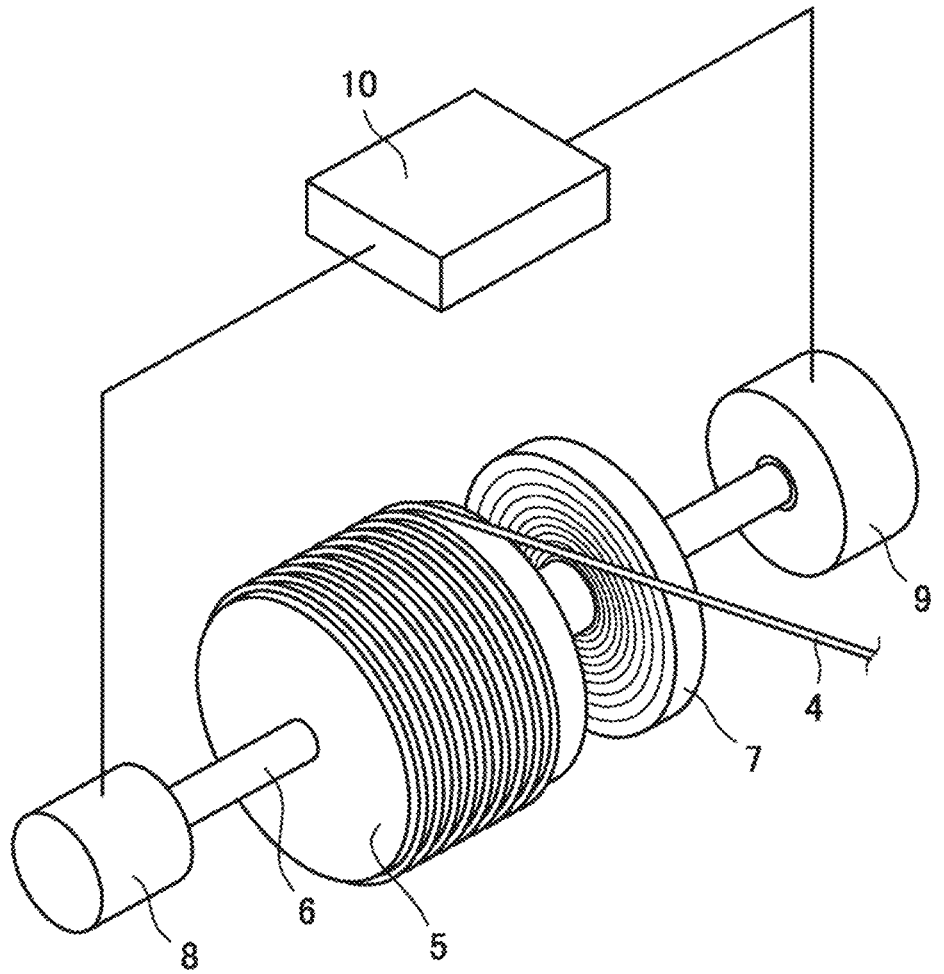
FIG. 2 is a schematic diagram illustrating an internal structure of the training device.

FIG. 2 is a schematic diagram illustrating the internal structure of the training device 1. Generally, a reel 5, a rotating shaft 6, a spiral spring 7, a rotary encoder 8, a magneto-rheological fluid brake 9, and a controller 10 are contained inside the housing 2.

The reel 5 is a cylindrical structure on which the cable 4 is wound. The rotating shaft 6 is fixed at a shaft center of the reel 5. The spiral spring 7 includes a strip of metal wound around the rotating shaft 6, and includes an inner end fixed to the rotating shaft 6 and an outer end fixed, for example, to an inner wall surface of the housing 2. As a result, the spiral spring 7 provides an urging force to wind, on the reel 5, the cable 4 that has been paid out.

The rotary encoder 8 is fixed to the housing 2 to detect, via the rotating shaft 6, a rotation state of the reel 5. Here, the rotation state is, for example, time-series information of the rotation angle, and is used to calculate the stroke amount and a paying-out rate when the cable 4 is paid out. Thus, in the present example embodiment, the reel 5 on which the cable 4 is wound and the rotary encoder 8 that detects the rotation state of the reel 5 define a "measurer" to measure the stroke amount of the cable 4.

The magneto-rheological fluid brake 9 is a known magneto-rheological fluid (MRF) device that controls the magnitude of applied magnetism to exert viscous resistance against an input rotational force. In the present example embodiment, the magneto-rheological fluid brake 9 is operable to apply a braking force against the rotation of the reel 5 via the rotating shaft 6, thereby applying a load to the paying out of the cable 4. If there is no force to pay out the cable 4, the braking force is released and the urging force by the spiral spring 7 causes the cable 4 to be wound onto the reel 5.

The controller 10 includes, for example, a known micro-controller control circuit, and is configured or programmed to calculate, based on an output value of the rotary encoder 8, a paid-out length of the cable 4, that is, the stroke amount. The controller 10 is configured or programmed to store a load curve (see FIG. 3) representing a relationship between the stroke amount of the cable 4 and the braking force by the magneto-rheological fluid brake 9. The controller 10 is configured or programmed to generate a braking force in the magneto-rheological fluid brake 9, based on a load curve described below, according to the stroke amount that changes during the movement.

Figure 3:
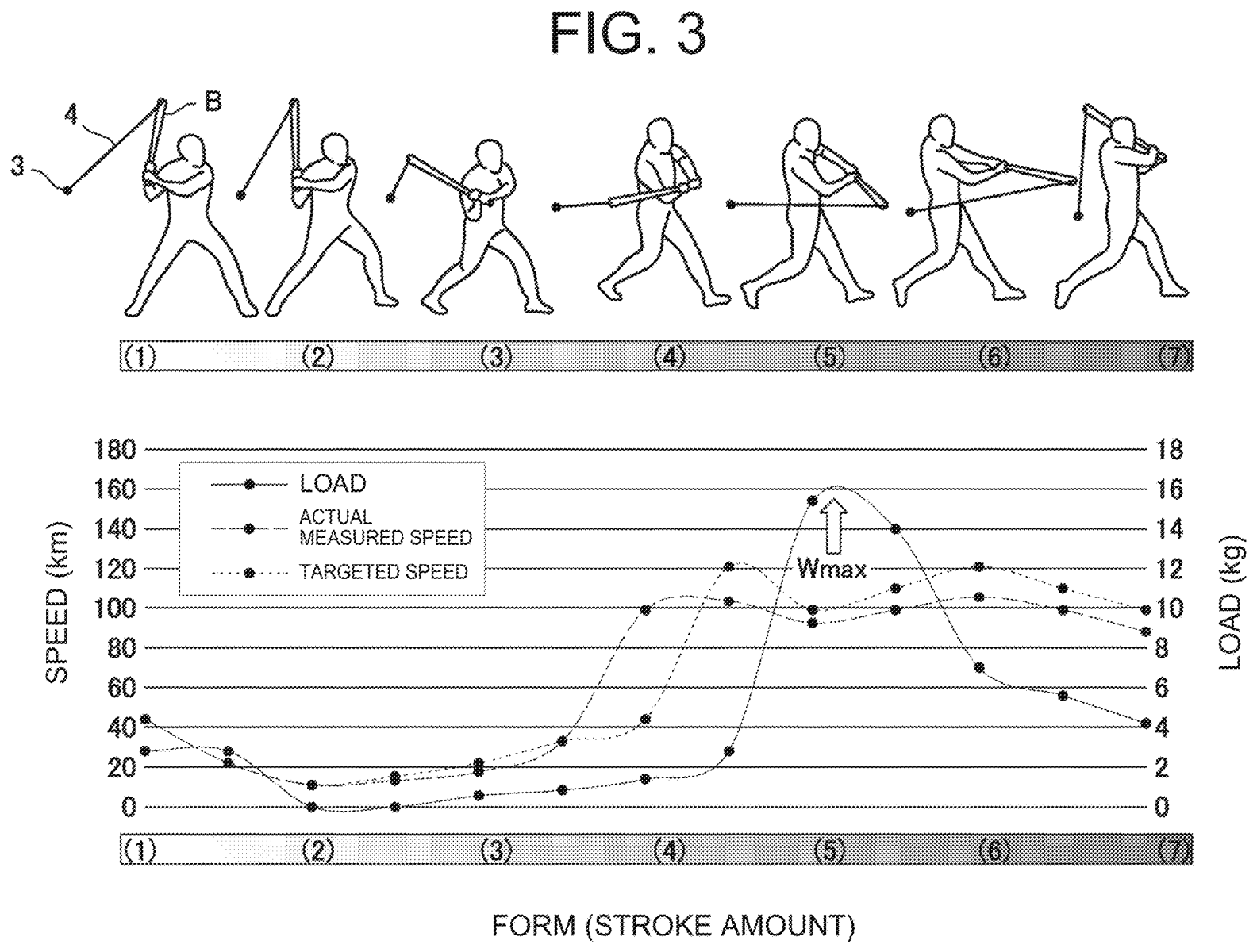

FIG. 3 is a waveform diagram showing a load curve corresponding to a series of movements. More specifically, the upper diagram of FIG. 3 illustrates a change in form during a batting movement used as an example in the present example embodiment, and illustrates changes in the stroke amount of the cable 4 corresponding to the changes in form. The lower portion in FIG. 3 shows a load curve representing changes in the load W [kg] of the braking force generated by the magneto-rheological fluid brake 9, according to the stroke amount [mm] corresponding to the form at each moment. Note that, for reference, an ideal waveform and an actual measured waveform of the speed at which the cable 4 is paid out according to the stroke amount are also shown.

The load curve represents a temporal change of the training load that experienced by the user, and is set in advance according to the movement. In the case of a batting movement as described in the present example embodiment, the set waveform has a low load at the start of the swing of the bat B, and reaches the maximum load, Wmax at the timing of impact indicated by (5) in FIG. 3. More specifically, in this example, the set waveform reaches the maximum load, Wmax of 16 [kg] at the timing when the stroke amount is 150 [mm], for example.

The load curve can be set based on prior measurements based on theoretical values for each training movement. Adjustment of characteristics such as the magnitude of the maximum load, Wmax at an impact point and a peak position depending on parameters such as expected ball speed and type of ball, can be implemented by modifying the waveform of the load curve.

Here, the above load curve may be stored in the controller 10 as a plurality of variation waveforms having different characteristics, or may be appropriately received from an external source as load curve data. The user can select and adjust the load curve such that the magnitude of the training load is changed according to progression of movement of the user to perform efficient training suited to a purpose, for example, improving swing speed immediately before impact.

As described above, the training device 1 of the present example embodiment can control the braking force by the magneto-rheological fluid brake 9 based on the stroke amount of the cable 4, to change the magnitude of the training load during movement. Therefore, with the training device 1, it is possible to efficiently perform training in line with a practical sport movement.

Furthermore, inside the housing 2 of the training device 1, the reel 5, the rotary encoder 8, and the magneto-rheological fluid brake 9 are arranged close to each other along a straight line on the same rotating shaft 6. As a result, the training device 1 can be compact as a whole, and can reduce loss in torque transmission between components, and improve the accuracy of stroke amount detection and the braking force by the magneto-rheological fluid brake 9.

Second Example Embodiment

Next, a second example embodiment of the present invention will be described. A training device 11 according to the second example embodiment differs from the training device 1 of the first example embodiment in a portion from which the cable 4 is paid out. Hereinafter, only the portion that differs from that of the first example embodiment will be described, and the components common to the first and second example embodiments are denoted by the same reference signs and detailed description thereof will be omitted.

Figure 4:
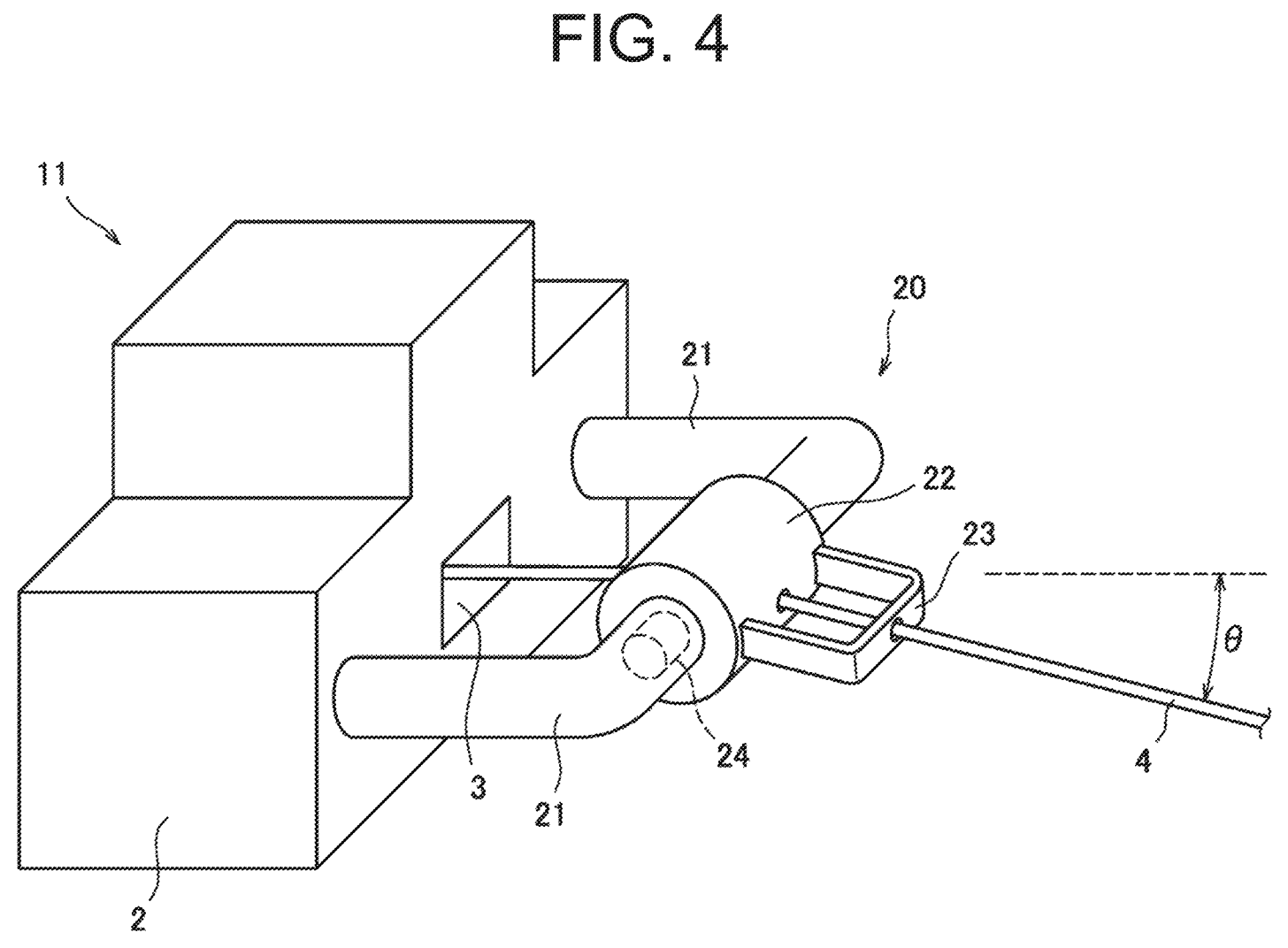

FIG. 4 is a perspective view illustrating appearance of the training device 11 according to the second example embodiment. The housing 2 and the internal structure of the training device 11 are substantially the same as those of the training device 1 of the first example embodiment. The training device 11 includes a cable angle detector 20 that is provided on the front side of the housing 2 and that detects a cable angle θ of the cable 4 that is being paid out.

More specifically, the cable angle detector 20 of the present example embodiment is a mechanism that detects the angle of the cable 4 extending in the vertical direction, and includes a pair of support units 21, a rotation unit 22, a protruding unit 23, and an angle sensor 24.

Each of the pair of support units 21 includes one end fixed to the front side of the housing 2 and the other end extending to provide a horizontal rotating shaft for the rotation unit 22. The rotation unit 22 includes a through hole through which the cable 4 extending from the opening unit 3 of the housing 2 is inserted, and is rotatably connected to the pair of support units 21. The protruding unit 23 is an optional component of the cable angle detector 20, and is a structure that facilitates rotational displacement of the rotation unit 22 to follow the extending direction of the cable 4. The angle sensor 24 can be, for example, a sensor similar to the rotary encoder 8 described above, and is operable to detect the rotation angle between the support units 21 and the rotation unit 22.

Thus, if the extension direction of the cable 4 that is being paid out from the opening unit 3 changes in response to movement of a user, the angle sensor 24 detects the rotation angle of the rotation unit 22 which rotates to follow the extension direction, and thus the cable angle detector 20 can detect the cable angle θ ($-90°<θ<90°$). The cable angle θ is constantly transmitted from the angle sensor 24 to the controller 10 during the operation of the training device 11.

Thus, the controller 10 can be configured or programmed to detect the cable angle θ in the vertical direction in addition to the stroke amount of the cable 4. Therefore, the controller 10 can more accurately recognize the state of movement of the user at each moment, and can control the braking force by the magneto-rheological fluid brake 9 to change the magnitude of the training load according to the stroke amount and cable angle θ.

Note that the configuration of the cable angle detector 20 is merely an example, and other configurations having similar functions may be adopted. In addition, although the present example embodiment includes the cable angle detector 20 to detect the cable angle θ in the vertical direction, a similar component may be combined with the configuration to detect a cable angle φ in the horizontal direction, in addition to the cable angle θ. In this case, the training device 11 can acquire the cable angle θ and the cable angle φ in addition to the stroke amount and thus identify the position of the end of the cable 4 in three-dimensional space. This allows for more precise control of the training load according to the path of the movement.

Third Example Embodiment

Next, a third example embodiment of the present invention will be described. A training system 12 according to the third example embodiment differs from the first example embodiment in that a plurality of training devices 1 of the first example embodiment are cooperatively used. Hereinafter, only the portion that differs from that of the first example embodiment will be described, and the components common to the first and third example embodiments are denoted by the same reference signs and detailed description thereof will be omitted.

Figure 5:
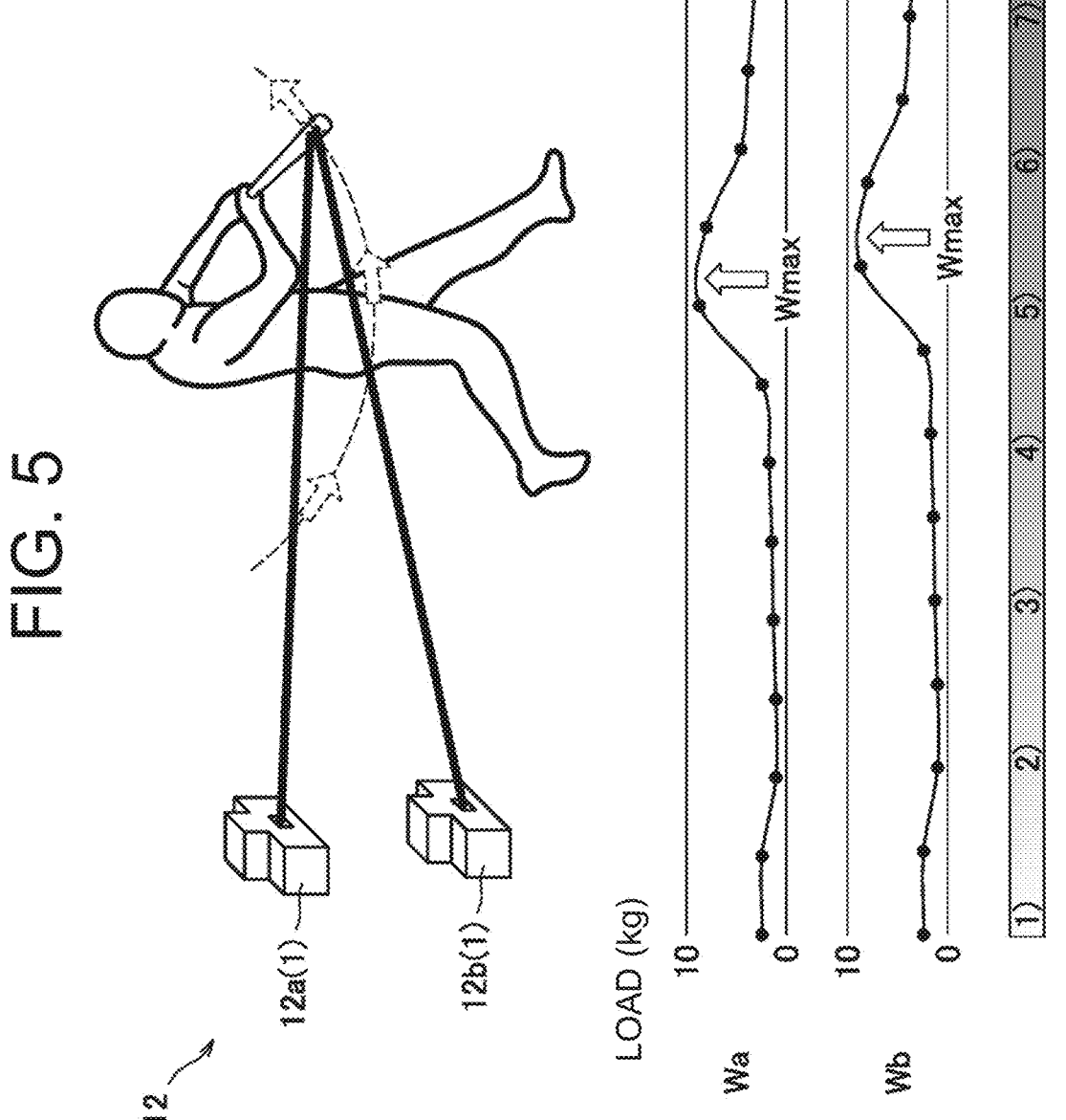
FIG. 5 is a conceptual diagram illustrating an example of use of a training system according to a third example embodiment of the present invention.

FIG. 5 is a conceptual diagram illustrating an example of use of the training system 12 according to the third example embodiment. The training system 12 includes a first training device 12a and a second training device 12b, each of which is the training device 1 of the first example embodiment and which are spaced apart from each other. Further, in the present example embodiment, an end of the cable 4 of each of the first training device 12a and the second training device 12b is connected to or to the vicinity of the center of the bat B.

As indicated by dashed arrows, a force required for a batting movement changes over time along a swing path of the bat B indicated by a dashed line. Thus, a training load suitable for more practical movement should be changed in direction along a swing path.

In the training system 12 of the present example embodiment, the load curves of the first training device 12a and the second training device 12b are set to have different waveforms, Wa and Wb, respectively, as shown in FIG. 5, and the first training device 12a and the second training device 12b cooperate to change the direction of the training load. More specifically, Wa and Wb are set to provide a training load which is a sum of a vector of load which the first training device 12a applies to the cable 4 and a vector of load which the second training device 12b applies to the cable 4, at each moment. The path of movement is calculated based on difference between the stroke amounts of the first training device 12a and the second training device 12b.

In the training system 12 according to the third example embodiment, the first training device 12a and the second training device 12b cooperatively provide a load with a magnitude set according to the stroke amount of the cable 4 along the path of movement. Thus, the training system 12 of the third example embodiment allows for generation of a training load more suitable for practical movement.

The arrangement of the first training device 12a and the second training device 12b is appropriately set according to movement of the training and the path of the movement. The end of the cable 4 of each of the first training device 12a and the second training device 12b may be connected to a different location on the bat B, to generate a complex training load.

Fourth Example Embodiment

Next, a fourth example embodiment of the present invention will be described. A training system 13 according to the fourth example embodiment differs from the first example embodiment in that a moving mechanism and the like are provided in addition to the training device 1 of the first example embodiment. Hereinafter, only the portion that differs from that of the first example embodiment will be described, and the components common to the first and fourth example embodiments are denoted by the same reference signs and detailed description thereof will be omitted.

Figure 6:
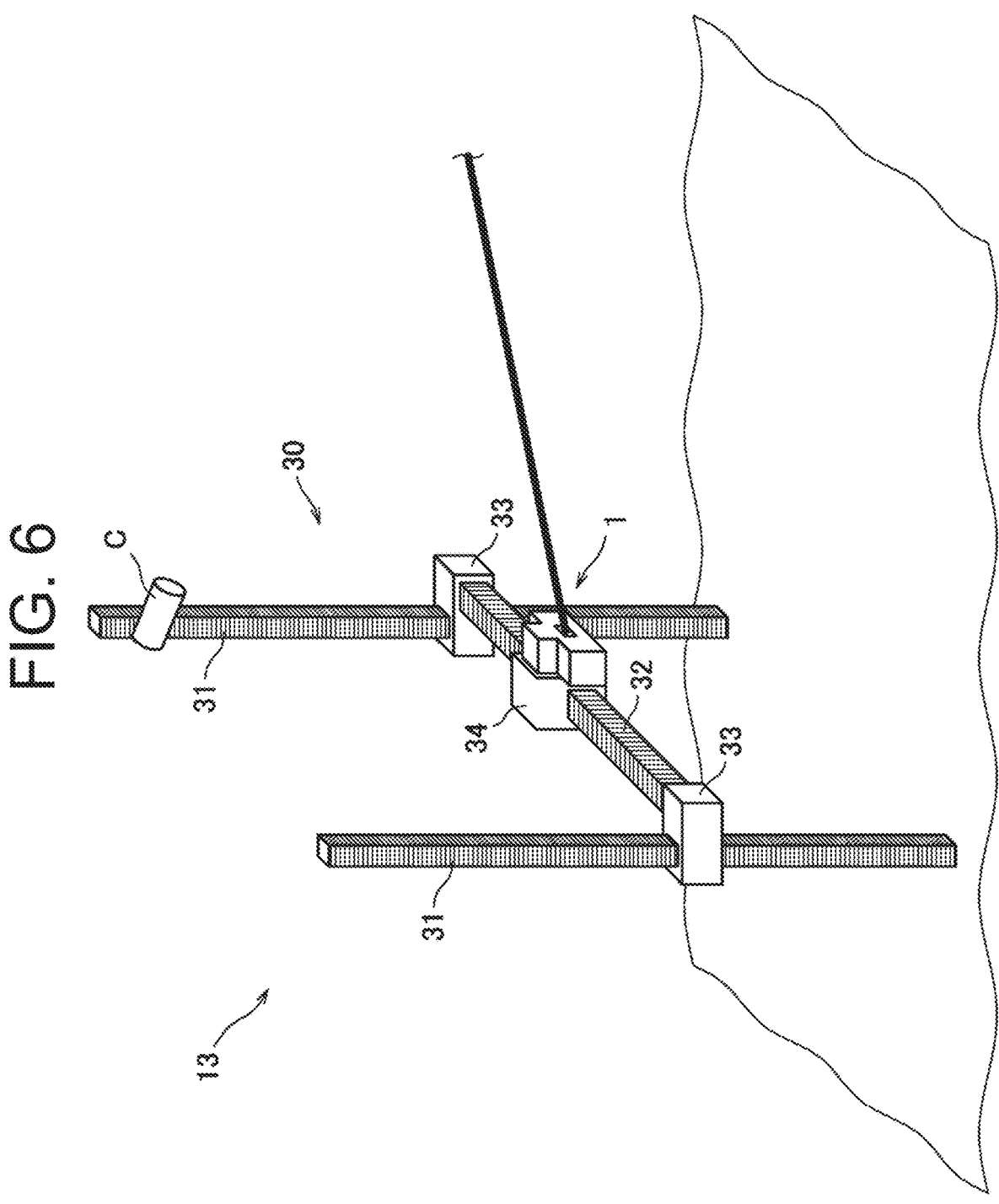
FIG. 6 is a configuration diagram of a training system according to a fourth example embodiment of the present invention.

FIG. 6 is a configuration diagram of the training system 13 according to the fourth example embodiment. The training system 13 includes a mover 30 to move the training device 1 of the first example embodiment in the horizontal and vertical directions. More specifically, the mover 30 includes a pair of vertical bars 31, a horizontal bar 32, a pair of vertical movement units 33, and a horizontal movement unit 34.

The pair of vertical bars 31 are, for example, two rod-shaped structures fixed to the floor and spaced apart from each other in the horizontal direction. The horizontal bar 32 is a rod-shaped structure that horizontally extends from one the pair of vertical bars 31 to the other. The pair of vertical movement units 33 are fixed to respective ends of the horizontal bar 32. The vertical movement units 33 include built-in motors (not illustrated), which define, together with the pair of vertical bars 31, so-called rack-and-pinion mechanisms to move the horizontal bar 32 upward and downward along the pair of vertical bars 31. The horizontal movement unit 34 is fixed to the housing 2 of the training device 1, and includes a built-in motor (not illustrated), which defines, together with the horizontal bar 32, a so-called rack-and-pinion mechanism to move the training device 1 in the horizontal direction.

Here, the built-in motors included in the pair of vertical movement units 33 and horizontal movement unit 34 are controlled by the controller 10 of the training device 1. Therefore, the controller 10 can freely move the training device 1 in the horizontal and vertical directions.

The controller 10 can be configured or programmed to control the mover 30 as described above, to adjust the position of the training device 1 according to, for example, a physique of a user and a type of movement. More specifically, the controller 10 can accept, via a wired or wireless communication means or a separately provided input device (not illustrated), input of information on a physique of a user such as the height and weight of the user, and information on a type of movement such as batting or pitching, and can move and position the training device 1 according to the information before training.

In the training system 13 of the present example embodiment, a camera C that is an imager to capture an image of a user may be provided, for example, on the vertical bar 31. The controller 10 may be configured or programmed to obtain information on the physique of the user whose image has been captured by the camera C, and automatically move the training device 1 to a position suited to the physique of the user.

Furthermore, in the training system 13 of the present example embodiment, the controller 10 may be configured or programmed to move the training device 1 as the user's form changes over time, while recognizing, by using the camera C, the progression of the training movement. This allows the training system 13 to change the direction of the load according to the path of the movement, as in the third example embodiment (FIG. 5) described above, and thus to generate a training load more suitable for practical movement.

The mover 30 is not limited to the configuration of the present example embodiment, and may be modified in various ways. For example, the horizontal bar 32 may be curved rather than straight. Furthermore, the mover 30 may move in only one of the horizontal and vertical directions depending on specifications.

Figure 7:
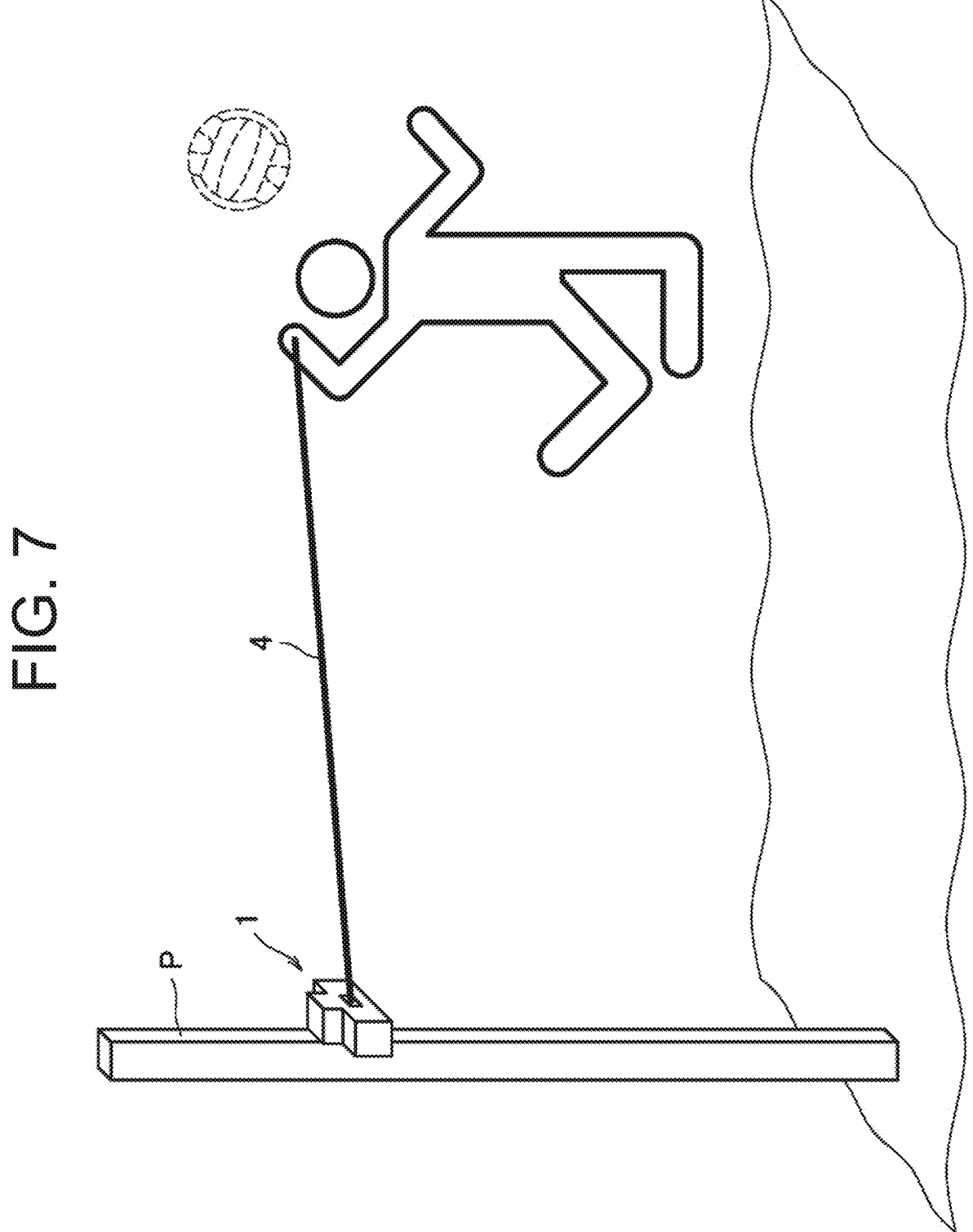
FIG. 7 is a conceptual diagram illustrating another example of use of the training device.

Although description of the example embodiments ends here, the present invention is not limited to the above-described example embodiments. The above-described example embodiments are example embodiments used for batting movements in baseball. However, for example, by appropriately setting an installation position and a load curve of the training device, example embodiments of the present invention can be used for a different event or movement, including pitching in baseball, swings in tennis or golf, oar stroke motions in rowing, and attacks in volleyball, as illustrated in FIG. 7. For example, in the case of oar stroke motions in rowing, the cable 4 is connected to a point on the oar along the extension of a line connecting a point gripped by a user and a fulcrum, to provide a resistive force against oaring motions. Furthermore, example embodiments of the present invention can be applied to a rehabilitation training device.

The above-described example embodiments are example embodiments in which the reel 5 and the rotary encoder 8 are used as a measurer to measure the stroke amount of the cable 4. However, another method that can calculate the stroke amount of the cable 4 with respect to movement of a user may be used. For example, a master unit for wireless communication may be provided in the housing 2 of the training device 1, a slave unit for wireless communication may be provided at the end of the cable 4, and the stroke amount of the cable 4 may be calculated based on changes in intensity of the radio wave or signal propagation time between the master unit and the slave unit, or the like.

In the housing 2 of the training device 1, the rotation state of reel 5 may be detected using a camera, instead of the rotary encoder 8. In this case, for example, a disk with circularly evenly spaced markings may be provided on the rotating shaft 6 of the reel 5, and the stroke amount of the cable 4 may be detected based on intervals between reading times of the markings captured by the camera or a rotation speed.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A training device, comprising:
a cable that is paid out in response to movement of a user;
a measurer to measure a stroke amount of the cable;
a magneto-rheological fluid brake to apply a braking force to the cable; and
a controller configured or programmed to calculate the stroke amount of the cable based on an output value of the measurer and to control the braking force based on the stroke amount to change a magnitude of a load during the movement; wherein
the measurer includes a reel on which the cable is wound and a rotary encoder to detect a rotation state of the reel; and
the reel, the rotary encoder, and the magneto-rheological fluid brake are provided on a same rotating shaft.

2. A training system, comprising:
the training device according to claim 1; and
a mover to move the training device; wherein
the controller is configured or programmed to adjust a position of the training device according to a physique of the user and a type of the movement.

3. The training system according to claim 2, further comprising an imager to capture an image of the user; wherein
the controller is configured or programmed to measure the physique of the user based on information from the imager.

4. The training system according to claim 2, further comprising an imager to capture an image of the user; wherein
the controller is configured or programmed to change the position of the training device during the movement, based on information from the imager.

5. The training device according to claim 1, further comprising a cable angle detector to detect a cable angle being an angle at which the cable is paid out; wherein
the controller is configured or programmed to control the braking force according to the stroke amount and the cable angle.

6. A training system, comprising a plurality of the training devices according to claim 1 spaced apart from each other; wherein
the plurality of training devices cooperate to control a direction of the load.

* * * * *